Oct. 25, 1966  J. KNOWLES  3,280,554
MOTOR VEHICLE GAS TURBINE DRIVE
Filed Sept. 30, 1964
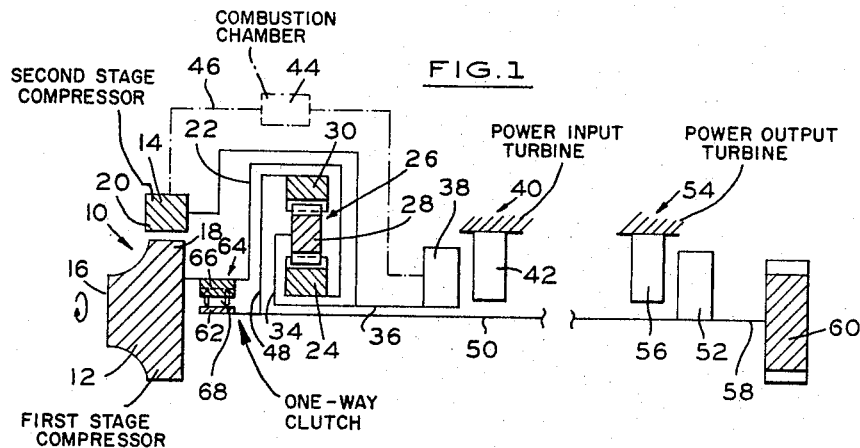
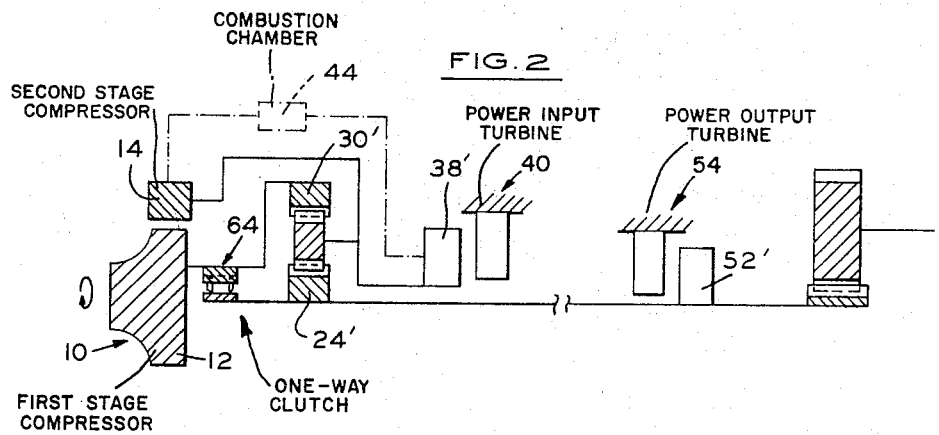
JAMES KNOWLES
*INVENTOR*
BY
John R. Faulkner
Robert E. McCollum
*ATTORNEYS*

United States Patent Office 3,280,554
Patented Oct. 25, 1966

3,280,554
MOTOR VEHICLE GAS TURBINE DRIVE
James Knowles, Bloomfield Hills, Mich., assignor to Ford Motor Company, Dearborn, Mich., a corporation of Delaware
Filed Sept. 30, 1964, Ser. No. 400,374
6 Claims. (Cl. 60—39.16)

This invention relates to a gas turbine engine construction for use in a motor vehicle. More particularly, it relates to a dual-spool type gas turbine engine having differentially driven components and a power output turbine that is automatically coupled or uncoupled to its compressor unit in response to the direction of flow of torque through the engine.

Most motor vehicle gas turbine engines in use today are of the single spool type having a freely rotatable power output turbine connected to the vehicle transmission input shaft. That is, the gasifier section generally consists of a high pressure turbine connected by a shaft directly to a single stage compressor, and a freely rotatable low pressure power output turbine connected to the transmission input shaft.

This type of construction has many disadvantages. First, it does not provide low specific fuel consumption at low and part-load operations. A gas turbine engine operates most efficiently when it is operating at the maximum compressor/turbine rated speed, and thus maximum output, and maximum turbine inlet temperature. In prior constructions, deceleration of the high pressure input turbine to reduce the speed of the output shaft caused a corresponding reduction in speed of the gasifier compressor, which lowered the compressor total air flow and pressure ratio as well as the maximum gas generator turbine inlet temperature. The total energy developed by the power input turbine, therefore, was fully absorbed by the compressor, and thus reduced the output power and torque. Since a motor vehicle must be capable of operating over a wide range of output shaft speeds and loads, a gas turbine engine of this type is not ideally suited for such an installation.

Secondly, an engine of the type described does not provide a maximum rate of initial acceleration and fast response to acceleration. Since the gasifier compressor is coupled directly to the compressor turbine, considerable energy is utilized to overcome the inertia of the compressor upon an acceleration of the power input turbine. Also, the total torque available to rotate the compressor is no greater than that of the power input turbine because no torque mutliplication is provided.

Thirdly, engines of this type generally are not capable of providing dynamic braking to the output shaft during a coast condition of operation of the vehicle, and, therefore, do not prevent a freewheeling condition of the output shaft. With the type of engine described, there is usually no connection between the freely rotating power output turbine and the other components of the engine. Similarly, this construction prevents push starts of the motor vehicle since the rotation of the gasifier section is independent of the rotation of the power output turbine.

The invention eliminates the above disadvantages by providing a gas turbine engine having a dual spool type construction in which the power output turbine is automatically coupled or uncoupled to its compressor stage in accordance with the direction of flow or torque through the engine. The invention provides low and high pressure turbines driving low and high pressure compressor stages, respectively. It utilizes plantary gearset for interconnecting the components in a manner to provide a differential drive therebetween to establish a split torque multiplying drive. The engine further utilizes the automatic locking and unlocking action of an overrunning clutch device to automatically couple or uncouple the power turbine from its compressor stage during accelerations and decelerations of the power input turbine member.

More specifically, the invention consists of an engine having a first stage low pressure compressor secured to one element of a planetary gearset, and a second stage higher pressure compressor secured to the planet carrier of the gearset and to the high pressure turbine. The power output turbine is coupled to a further element of the planetary gearset, and connected by an overrunning clutch to the first stage compressor. The gearset provides an initial torque multiplication and a split torque drive of both of the compressor stages.

The above construction provides a fast initial acceleration, and high torque by the power input turbine differentially driving the two compressor stages at efficient operating speeds faster than they would be if the first stage compressor were coupled directly to the power output turbine. When the power output turbine speed reaches that of the first stage compressor, the overrunning clutch engages, and the gearset becomes locked up to drive all of the components at the same speed. This increases the fuel economy.

A deceleration of the power input turbine, for operation at part or low load conditions, permits a decrease in speed of the high pressure compressor stage. However, the power output turbine now becomes the driver, and maintains all of the engine components at the speed of the power output shaft due to the engagement of the one-way clutch. The speed and air flow from the power turbine compressor, therefore, remains at an efficient operating level, and the turbine inlet temperature and other factors affecting efficiency are maintained at efficient levels.

The invention also provides dynamic braking by the automatic engagment of the power output turbine with its compressor stage whenever the output shaft becomes the driving member of the engine, such as during coast conditions of operations of the vehicle. That is, the engagement of the clutch between the power output turbine and the first stage compressor to be driven by the power turbine, the inertial resistance of the compressor to dynamic rotation by the power turbine providing dynamic braking to rotation of the output shaft.

The invention also provides a push start of the motor vehicle due to the overrunning clutch connection between the power output turbine and the first stage compressor. With all parts stationary, rotation of the power output turbine drives the first stage compressor to provide initial air flow to the combustion chamber to support combustion, and, therefore, drive of the power input turbine. This is supplemented by the air flow from the second stage compressor, which is driven differentially by the planetary gearset.

It is an object of the invention, therefore, to provide a gas turbine engine construction for a motor vehicle that is simple in construction, easy to assemble and disassemble, and economical in operation.

It is another object of the invention to provide a motor vehicle gas turbine engine having a number of spools, and a power output turbine that can be coupled or uncoupled to one of the compressor stages in response to the direction of flow of torque through the engine.

It is a further object of the invention to provide a motor vehicle gas turbine engine having differentially driven components, and a power output turbine that can be coupled or uncoupled to one stage of a multi-stage compressor unit.

Another object of the invention is to provide a gas turbine engine for a motor vehicle that not only provides good initial acceleration and high torque levels, but also provides dynamic braking and push starts of the vehicle, as well as low specific fuel consumption at low and part load operating ranges of the vehicle.

Other objects, features and advantages of the invention will become apparent upon reference to the succeeding, detailed description thereof, and to the drawings illustrating the preferred embodiments thereof; wherein, FIGURE 1 shows, schematically, a longitudinal cross-sectional view of one form of an engine embodying the invention; and, FIGURE 2 illustrates, schematically, a modification of the engine of FIGURE 1.

FIGURE 1 shows a gas turbine engine essentially of the dual spool type. It has a two-stage compressor section 10 with low and higher pressure compressor stages 12 and 14. The low pressure compressor 12 is shown as being of a known centrifugal type. Air is taken in axially at its inlet end 16, and is discharged radially through an outlet 18 into the inlet 20 of the second stage compressor unit 14. While not shown, a suitable intercooler or heat exchanger would normally be provided between the two units for reducing the temperature of the first stage air prior to its entry into unit 14. This is desirable in a motor vehicle construction so that less work is required of the high pressure compressor unit.

While the two compressor stages are shown as being of the radial flow type, it will be clear that axial flow compressor units could be used without departing from the scope of the invention. Low pressure compressor unit 12 is drivingly connected by a member 22 to the sun gear 24 of a planetary gearset 26. The gearset is of the simple three-element type having a number of spaced planet pinion gears 28 meshing with the sun gear and a ring gear 30. The pinion gears are rotatably mounted and supported upon a planet carrier 32 that is connected by a flange 34 to one end of an intermediate sleeve shaft 36. The opposite end of shaft 36 is splined or otherwise connected to the rotor 38 of a high pressure power input turbine unit 40.

Turbine unit 40 is shown as being of the axial flow type having a row of stator vanes 42. The rotor 38 is adapted to be driven by the products of combustion from a combustion chamber indicated schematically at 44, which, as indicated by dotted line 46, receives the heated, compressed air from the second stage compressor unit 14. A diffuser section, not shown, would be positioned in front of the combustion chamber to suitably convert the potential energy of the air into static pressure in a known manner. Similarly, suitable inlet nozzles, not shown, would be positioned ahead of the turbine rotor 38 for increasing the velocity and decreasing the pressure of the exhaust products from the combustion chamber.

The gearset ring gear 30 is connected by a flange 48 to one end of the power turbine output shaft 50. At its opposite end, the shaft is splined or otherwise connected to the rotor 52 of a low pressure power output turbine unit 54. This latter unit is provided with a row of stator vanes 56, and receives the high temperature exhaust gases discharged from the turbine unit 40. The power output turbine rotor 52 is connected by a shaft 58 directly to the input gear 60 of the vehicle transmission, not shown.

As stated previously, power output turbine 52 is automatically adapted to be clutched or declutched to the first stage compressor 12 in accordance to the direction of torque flow through the engine to provide the acceleration, dynamic braking, push starts, and low specific fuel consumption characteristics described. For this purpose, the forward end of power output shaft 50 has fixed to it the inner annular race 62 of a one-way or overrunning clutch device 64. This device is of a known mechanical type, and has an outer annular race 66 spaced from inner race 62 by a number of sprags or rollers 68. The outer race is directly connected to the first stage compressor unit 12. The overrunning clutch operates in a known manner. The rollers or sprags 68 wedge the two races together to prevent relative rotation therebetween upon rotation of power output shaft 50 in a clockwise direction faster than the rotation of compressor unit 12. The rollers or wedges 68 move to an inoperative position unwedging the races upon faster rotation of compressor unit 12 in a clockwise or forward direction relative to the power driven output shaft 50.

In overall operation, with the engine initially at rest, a normal start of the engine is provided by cranking the first stage compressor unit 12 by an external source, not shown. A clockwise rotation of compressor unit 12 unlocks one-way clutch unit 64 and drives sun gear 24 in a forward or clockwise direction. Since the power output turbine rotor 52 is stationary and resists movement because of its direct connection to the input gear of the vehicle transmission, ring gear 30 now acts as a reaction member for the gearset. Accordingly, clockwise rotation of sun gear 24 will cause the pinion gears 28 to planetate or walk around within stationary ring gear 30 and effect a slow rotation of planet carrier 32 and the turbine rotor 38. The speed of turbine 38 will be determined by the gear reduction ratio through the gearset. Simultaneously, the power input turbine 38 will be driven clockwise to some extent by the slow forward rotation of the second stage compressor unit 14, which rotates due to the entry of air into it from compressor unit 12.

When the compressor stages have reached sufficient speeds to provide the necessary air flow to support combustion in chamber 44, light-off is initiated, resulting in the products of combustion being discharged against turbine 38 to drive the same. Thereafter, the power input turbine rotor 38 takes over the drive of the second stage compressor unit 14. Since the torque output of turbine 38 is divided by the gearset between the second stage compressor unit 14 and the carrier unit 32. Sun gear 24 is now overdriven by the forwardly rotating carrier 32 to overdrive the first stage compressor unit 12. The rate of increase in air flow from compressor 12 is now, therefore, quite rapid. As a result, the increase in exhaust gases discharged from the primary turbine unit 40 into the power output turbine 54 slowly begin to rotate this latter unit in a clockwise direction. When the speed of the power output turbine reaches that of compressor unit 12, the one-way clutch 64 will engage. Subsequent drive of compressor unit 12 will, therefore, be taken over by the power output turbine 52. At this time, both the sun and ring gears of the planetary gearset will be driven by the power output turbine at the same speeds, and, therefore, will effect a lockup of the gearset. This normally is designed to occur at a cruising speed of the vehicle. Thereafter, all of the compressor and turbine stages are driven at the same speed and at the speed of the power output turbine 52.

Assume now that an acceleration of the vehicle is desired. The operator depresses the vehicle accelerator pedal, not shown, which supplies more fuel to the combustion chamber 44, and, therefore, immediately increases the speed of rotation of the power input turbine rotor 38. This increase in torque to turbine 38 is split between the second stage compressor unit 14 and the planet carrier 32. Ring gear 30 again acts as a reaction member to effect a torque multiplication of the drive from power turbine rotor 38 to the first stage compressor unit 12 and the second stage unit 14. This causes an overdrive of unit 12 and corresponding increase in speed of unit 14, which is permitted by the unlocking or overrunning action of the one-way clutch 64. This increase in speed increases the air flow to the combustion chamber to provide the necessary volume of combustion products to the power turbine. This then results in an absorption of the energy of the gases by the power output turbine rotor 52, and an increase in speed of rotor 52 and the speed of the power input gear 60 to the transmission.

If now a deceleration of the vehicle is desired, a partial or full release of the accelerator pedal, not shown, causes a corresponding decrease in the speed of turbine rotor 38. This would normally cause a decrease in speed of the compressor stages and result in a decrease in air flow to the combustion chamber. This in turn would result in a loss in operating efficiency due to the decrease in fuel consumption and the resultant lowering of the turbine inlet temperature. However, due to the construction described, the power output turbine now becomes a driving member, reversing the direction of torque flow through the engine during this coasting condition. This faster rotation of the power output turbine relative to compressor unit 12 maintains the one-way clutch unit 64 locked up and, therefore, causes compressor unit 12 to be driven at the speed of the power output shaft 50. The planetary gearset, therefore, remains locked up, and all units continue to be driven at the slowly reducing output shaft speed. The speeds of the compressor units, therefore, tend to be maintained at efficient operating levels so that when power is again desired, less energy will be required to accelerate the compressors to provide the necessary air flow.

During this condition of operation, dynamic braking is also provided. Due to the locked up condition of the gearset and the mechanical connection of compressor unit 12 to power output shaft 50 by clutch 64, the inertia of compressor unit 12 exerts a resistance to faster rotation by the power output turbine and thereby absorbs all of the energy of the turbine during this condition of operation. A braking effect is thereby applied to shaft 50 and the vehicle transmission.

A push start of a stalled engine is accomplished in essentially the same manner as described above in connection with the dynamic braking of the vehicle. In this case, the initial rotation of power output turbine shaft 50 engages clutch 64 to drive compressor unit 12. This simultaneously locks up the gearset and causes rotation of compressor unit 14 and power input turbine rotor 38 at the same speed. When the speed of the compressor stages is sufficient to provide the necessary air to combustion chamber 44 to support combustion, light-off effect and sustaining of the drive of the engine is taken over by the high turbine unit 40. The subsequent attainment of a sufficient energy level by the gases discharge into the turbine unit 54 will cause a drive of the power output shaft 58.

A neutral or engine idling condition can also be provided merely by releasing the vehicle accelerator pedal with shaft 50 stationary, since any rotation of the compressor stage 12 in a clockwise direction faster than the output shaft 50 frees the compressor unit for rotation by itself.

FIGURE 2 illustrates a modification of the engine of FIGURE 1. In this figure, the details of construction are essentially the same as those in FIGURE 1 except for the specific connections between the first stage compressor unit 12 and power output turbine rotor 52 to the gearset. In FIGURE 2, compressor unit 12 is connected to ring gear 30', while the power output turbine 52 is connected to sun gear 24'. The details of operation, however, remain essentially the same. The only difference between the FIGURE 1 and 2 constructions is in the reduction of the drive through the planetary gearset. For this reason, further details of construction and operation of the FIGURE 2 embodiment are believed to be unnecessary.

While the turbine stages of the FIGURE 1 and 2 embodiments have both been illustrated as being of the single stage axial flow type, it will be clear that more stages and/or radial flow type turbine units could be used without departing from the scope of the invention. Also, while the stator vanes of turbine stages 40 and 54 have been illustrated as stationary, it will be clear that they could be adjustable, i.e. variable, without departing from the scope of the invention. Further details of the engine beyond that given above are not described since they are known and are believed to be unnecessary for an understanding of the invention.

From the foregoing, it will be seen that the invention provides a gas turbine engine for a motor vehicle that permits the engine to operate efficiently over the entire speed and load span of the vehicle. It also provides an infinitely variable drive to the power input element of the transmission. It will also be seen that the engine operates efficiently at low and part loads by permitting the compressor stages to operate at efficient speeds. Furthermore, good fuel economy is achieved during cruising speeds of the vehicle due to the automatic lock-up of the gearset when the output shaft attains the proper speed to cause all of the components of the engine to rotate together. It will also be seen that a split torque drive as well as a torque multiplication is provided by the inclusion of the planetary gearset in the connections between the gasifier components as well as between the power output turbine and its compressor.

While the invention has been illustrated in its preferred embodiments in the figures, it will be clear to those skilled in the arts to which the invention pertains that many changes and modifications may be made thereto without departing from the scope of the invention.

I claim:

1. A motor vehicle gas turbine engine comprising, first and second stage compressor members, rotatable power input and output turbine members, a power output shaft, and a planetary gearset having a plurality of rotatable elements, means connecting one of said compressor members to said power input turbine member and to one of said elements, means connecting the other of said compressor members to another of said elements, means connecting said power output turbine to said power output shaft and to a further one of said elements, and disengageable means between said other compressor member and said power output turbine when engaged drivingly interconnecting the same to lock up said gearset for the drive of all of said members as a unit, said gearset providing a differential drive of some of said members upon acceleration of said power input turbine member relative to said power output turbine and disengagement of said disengageable means.

2. A motor vehicle gas turbine engine comprising, first and second stage compressor members, rotatable power input and output turbine members, a power output shaft, and a planetary gearset having a plurality of rotatable elements including sun and ring gears and a planet carrier, means connecting one of said compressor members to said power input turbine member and to said planet carrier, means connecting the other of said compressor members to one of said sun and ring gears, means connecting said power output turbine to said power output shaft and to the other of said sun and ring gears, and overrunning clutch means between said other compressor member and said power output turbine when operable drivingly interconnecting the same to lock up said gearset for the drive of all of said members as a unit, said gearset providing a differential torque drive of some of said members upon acceleration of said power input turbine relative to said power output turbine.

3. A motor vehicle gas turbine engine comprising, first and second stage compressor members, separately rotatable power input and output turbine members, a power output shaft, and a planetary gearset having a plurality of rotatable elements including sun and ring gears and a planet carrier, means connecting said second stage compressor member to said power input turbine member and to said planet carrier, means connecting said first stage compressor member to said sun gear, means connecting said power output turbine to said power output shaft and to said ring gear, and overrunning clutch means between said first stage compressor member and said power output turbine when operable drivingly interconnecting the same to lock up said gearset for the drive of all of said members as a unit, said gearset providing a differential torque drive of said first and second stage compressor members at speeds faster than the speed of said power output turbine member upon acceleration of said power input turbine relative to said power output turbine.

4. A motor vehicle gas turbine engine comprising, first and second stage compressor members, separately rotatable power input and output turbine members, a power output shaft, and a planetary gearset having a plurality of rotatable elements including sun and ring gears and a planet carrier, means connecting said second stage compressor member to said power input turbine member and to said planet carrier, means connecting said first stage compressor member to said ring gear, means connecting said power output turbine to said power output shaft and to said sun gear, and overrunning clutch means between said first stage compressor member and said power output turbine when operable drivingly interconnecting the same to lock up said gearset for the drive of all of said members as a unit, said gearset providing a differential torque drive of said first and second stage compressor members at speeds faster than the speed of said power output turbine member upon acceleration of said power input turbine relative to said power output turbine.

5. A motor vehicle gas turbine engine comprising, first and second stage compressor members, separately rotatable power input and output turbine members, a power output shaft, and a planetary gearset having a plurality of rotatable elements including sun and ring gears and a planet carrier, means connecting one of said compressor members to said power input turbine member and to said planet carrier, means connecting the other of said compressor members to one of said sun and ring gears, means connecting said power output turbine to said power output shaft and to the other of said sun and ring gears, and overrunning clutch means between said other compressor member and said power output turbine member engagable upon rotation of said power output turbine member in one direction relative to said other compressor member for drivingly interconnecting the same to lock up said gearset for the drive of all of said members as a unit, said gearset providing a differential torque drive of some of said members upon acceleration of said power input turbine relative to said power output turbine.

6. A motor vehicle gas turbine engine comprising, first and second stage compressor members, separately rotatable power input and output turbine members, a power output shaft, and a planetary gearset having a plurality of rotatable elements including sun and ring gears and a planet carrier, means connecting said second stage compressor member to said power input turbine member and to said planet carrier, means connecting said first stage compressor member to one of said sun and ring gears, means connecting said power output turbine to said power output shaft and to the other of said sun and ring gears, and overrunning clutch means between said first stage compressor member and said power output turbine member engagable upon rotation of said power output turbine member in one direction relative to said first stage compressor member for drivingly interconnecting the same to lock up said gearset for the drive of all of said members as a unit, said gearset providing a differential torque drive of some of said members and an overdrive of said first stage compressor member upon acceleration of said power input turbine relative to said power output turbine.

References Cited by the Applicant
UNITED STATES PATENTS

| | | |
|---|---|---|
| 2,458,037 | 1/1949 | Vincent et al. |
| 2,583,872 | 1/1952 | Newcomb. |
| 2,613,749 | 10/1952 | Price. |
| 2,693,080 | 11/1954 | Hutchinson. |
| 2,726,508 | 12/1955 | Halford et al. |
| 2,748,564 | 6/1956 | Marchal et al. |
| 2,804,748 | 9/1957 | Hutchinson. |
| 3,038,307 | 6/1962 | Oprecht. |
| 3,088,414 | 5/1963 | Ozgur. |

OTHER REFERENCES

The Oil Engine and Gas Turbine—"The Gas Turbine Design, Developments and Applications," June, 1958.

JULIUS E. WEST, *Primary Examiner.*